United States Patent
Babu et al.

(10) Patent No.: US 8,971,515 B2
(45) Date of Patent: Mar. 3, 2015

(54) METHOD TO STREAM COMPRESSED DIGITAL AUDIO OVER CIRCUIT SWITCHED, VOICE NETWORKS

(75) Inventors: Harish Babu, Bangalore (IN); Mouli Raman, Bangalore (IN)

(73) Assignee: Onmobile Global Limited, Bangalore (IN)

( * ) Notice: Subject to any disclaimer, the term of this patent is extended or adjusted under 35 U.S.C. 154(b) by 1057 days.

(21) Appl. No.: 12/515,173

(22) PCT Filed: Nov. 14, 2007

(86) PCT No.: PCT/IN2007/000537
§ 371 (c)(1),
(2), (4) Date: May 15, 2009

(87) PCT Pub. No.: WO2008/059533
PCT Pub. Date: May 22, 2008

(65) Prior Publication Data
US 2010/0067672 A1    Mar. 18, 2010

(30) Foreign Application Priority Data
Nov. 16, 2006  (IN) .............................. 2128/CHE/2006

(51) Int. Cl.
*H04M 3/00*    (2006.01)
*H04M 5/00*    (2006.01)
*H04M 3/42*    (2006.01)
*H04L 29/06*   (2006.01)

(52) U.S. Cl.
CPC ......... *H04M 3/42093* (2013.01); *H04L 65/607* (2013.01); *H04M 3/42017* (2013.01); *H04L 65/4084* (2013.01); *H04M 2207/203* (2013.01); *H04L 65/602* (2013.01)
USPC ........................................ 379/257; 379/207.16

(58) Field of Classification Search
CPC ......... H04M 11/00; H04M 3/00; H04M 5/00; H04M 1/64; G06F 15/16
USPC ........... 379/257, 142.01, 373.01, 350, 207.16
See application file for complete search history.

(56) References Cited

U.S. PATENT DOCUMENTS

| 7,068,641 | B1 |  | 6/2006 | Allan et al. |
| 2006/0023862 | A1 | * | 2/2006 | Sutcliffe ........................ 379/257 |
| 2007/0127642 | A1 | * | 6/2007 | Bae et al. .................... 379/88.13 |
| 2007/0294425 | A1 | * | 12/2007 | Sobti et al. ..................... 709/231 |

FOREIGN PATENT DOCUMENTS

EP    1 657 900 A1    5/2006

* cited by examiner

*Primary Examiner* — Simon King
(74) *Attorney, Agent, or Firm* — Birch, Stewart, Kolasch & Birch, LLP

(57) ABSTRACT

A system and a method for streaming audio data to a plurality of callers in a telecommunication system have been disclosed. The system facilitates streaming of audio data to a plurality of callers by establishing a single connection with an audio data publisher. The system receives the audio data from the audio data publisher over the internet or a similar network and streams the audio data to a plurality of callers over a telecommunication network. The audio data can be streamed to a caller as a ring-back tone of a callee.

2 Claims, 6 Drawing Sheets

METHOD TO STREAM COMPRESSED DIGITAL AUDIO OVER CIRCUIT SWITCHED, VOICE NETWORKS

FIELD OF THE INVENTION

The present invention related to streaming data in a telecommunication system. More specifically, the invention relates to streaming audio data to a caller in a telecommunication system.

BACKGROUND OF THE INVENTION

Streaming refers to a method for transmitting and receiving media in an uninterrupted manner in a communication system. Media transferred through streaming method is hereinafter referred to as a media stream. The media stream is received from a media provider and is transmitted to individuals, hereinafter referred to as media receivers. The media receivers receive the media stream in a continuous, uninterrupted manner. A radio and a television are examples wherein the media stream, provided by the media provider, is continuously transmitted to the media receivers. Media can be audio, video or any other data. Audio data transferred through streaming method is hereinafter referred to as an audio stream.

Typically media streams are either 'on demand' or live. On demand streams are generally stored on a server, and are available to be transmitted at the media receiver's request. Live streams are only available at one particular time, for example in an audio stream of a live sport commentary.

Radio is a popular medium for streaming audio to individuals. The audio being streamed may be a news report, music, live commentary etc. The audio is streamed by a radio channel from a radio station (media provider) which is heard by any individual (media receiver) tuned into the radio channel.

However, to access audio stream though a radio, the individual requires to carry a radio receiver. Further, the quality of the radio streaming keeps fluctuating while traveling as the radio signals may face obstacles on its way to the radio receiver. Furthermore, the individual cannot choose the audio to be streamed, and has to listen to whatever is being broadcasted by the radio channel. For example, the individual may want to hear live commentary of a particular cricket match which the radio channel might not be streaming. The audio being broadcasted may also be interrupted by commercials or some other announcements, which cause inconvenience to the individual.

Recently, with increasing number of Internet users, streaming of audio over the Internet has become popular. Internet is a form of a packet switched network wherein data is transferred from one node to another, in the form of packets. Packet switched networks allow simultaneous communication between multiple node and use the bandwidth available for data transfer very efficiently. Packet switched network can efficiently manage the large bandwidth requirements of streaming audio and have thus made streaming over the Internet possible.

Further, the Internet enables an individual to select the audio that the individual wants to listen. The individual can connect to a certain streaming server that is streaming the audio of her choice in order to listen to the audio. Typically, the quality of the audio streamed through Internet is stable and non-fluctuating. However to access the Internet, one requires an Internet access device like a desktop computer, laptop etc, and needs a continuous source for Internet connection. This may not be viable for a user who is outdoor or traveling.

Despite the abovementioned limitations, the existing streaming systems have made streaming audio popular. A large number of people listen to the streaming audio which has resulted in a fast growing streaming audio industry. Due to this there is a need for other mediums, involving media transfer over a data network, for example telecommunication medium, to provide streaming audio facilities.

In recent times, there has been a considerable increase in the number of telecommunication service users A telecommunication service enables a user to communicate with other telecommunication service users using a telecommunication terminal like mobile phone, landline phone etc. A mobile telecommunication service user is hereinafter referred to as a mobile phone user. A mobile telecommunication terminal is hereinafter referred to as a mobile phone.

There exist mobile phones which have a radio receiver and also have internet access. However, such mobile phones are expensive. Further streaming through the radio receiver of such a mobile phone suffers from all the drawbacks of a conventional radio receiver. Also the internet access functionality through these devices is very limited. The mobile phone may not allow streaming functionality through internet. Moreover, the speed at which, currently, the internet is accessed through such mobile phones prevents a continuous flow of the audio.

Typically, telecommunication networks are circuit switching networks. A circuit switching network establishes a dedicated circuit between nodes for users to communicate. Once a circuit is established, the circuit cannot be used for communication by any other party until the circuit is disengaged, i.e. the circuit cannot be shared by multiple users simultaneously. A circuit switching network is designed to carry node-to-node data traffic and as such does not provide for multiple users to listen to a streaming audio data from a single source. The existing systems do not allow, for example, live commentary of a particular match to be streamed to multiple users.

The above mentioned methods of streaming have certain limitations. A method for streaming audio in telecommunication system is therefore required to overcome the limitations mentioned above. A method is required for providing an audio stream to a mobile phone user wherein the user is not required to carry additional devices or use expensive devices to access the audio stream. Further, a method is required for streaming audio to the mobile phone user which gives the mobile phone user, the choice of audio for streaming. A method is required which allows continuous streaming of audio to the mobile phone user with minimum fluctuations in quality.

DEFINITIONS

Caller: The mobile phone user who initiates a call is called a 'caller'

Callee: The mobile phone user to whom the call is made is called a 'callee'

Ring back Tone (RBT): A tone which is played to the caller while she is waiting for the callee to respond to the call is called an RBT. The RBT is played till the callee responds to the call.

RBT subscriber: An RBT subscriber is any telecommunication server user who has subscribed to an RBT service. The RBT service enables the RBT subscriber to select any sound, music, tone or a combination thereof and set is as the RBT of the RBT subscriber.

An RBT is the tone heard by caller 102, having made a call to callee 106, while waiting for callee 106 to initiate a response.

The RBT service enables an RBT subscriber to replace the monotonous tone with any sound, music, voice, tone etc. and a combination thereof. For example, the caller while initiating a call with the callee, wherein the callee is an RBT subscriber, hears a particular song set by the callee as the callee's RBT, while waiting for the callee to initiate a response.

SUMMARY OF THE INVENTION

A system and a method for streaming audio data to a plurality of callers in a telecommunication system have been disclosed. The audio data being streamed may be a news report, music, live commentary, etc. An audio data publisher streams the audio data to a broadcasting server. A streaming server establishes a connection with the broadcasting server for receiving the audio data. The audio data is received in a packet switched network. From the streaming server, the audio data can be streamed to a plurality of callers over a circuit switched telephony network. According to an embodiment of the invention, the audio data is received by the streaming server in a compressed format and is streamed to the plurality of callers in an uncompressed format. The audio data once being received from the broadcasting server by the streaming server can be streamed to the plurality of callers without establishing additional connections with the broadcasting server. The streaming server receives the audio data over the internet or a similar packet switched network and streams the audio data to a plurality of callers over a telecommunication network.

According to an embodiment of the invention, a caller makes a phone call for receiving the audio data by dialing a particular number. The streaming server gathers information about the audio data requested by the caller by interacting with the caller. For example, streaming server participates in an interactive voice session with the caller by transmitting voice commands to the caller and receiving caller's response to the voice commands. Based on the information gathered about the audio data by interacting with the caller, the streaming server establishes connection with a particular broadcasting server that is broadcasting the audio data. After receiving the audio data, the streaming server decodes it into a particular uncompressed format and streams it to the caller. On receiving a request for the audio data to be streamed to another caller, the uncompressed audio data is provided to the other caller without establishing another connection with the particular broadcasting server. A replicator generates a plurality of audio streams of the audio data based on the plurality of callers requesting the audio data. One audio stream is created for each caller. The audio stream is transmitted to each caller over the telecommunication network.

According to another embodiment of the invention, a callee can set streaming of the audio data to be used as an RBT of the callee. The callee can select the streaming audio data to be played as the RBT to a caller calling the callee. The caller on initiating a call to the callee hears the streaming audio data while waiting for the callee to initiate a response. Streaming server receives a request for streaming the audio data to the caller, on the caller initiating a call to the callee. Based on the subscription information of the callee, streaming server establishes connection with a particular broadcasting server broadcasting the audio data. The audio data is received from the broadcasting server, in a compressed format and is then uncompressed by the streaming server to a particular format. The uncompressed audio data is then streamed to the caller. If the audio data is already being streamed to another caller, no new connections are established with the particular broadcasting server. The replicator generates an audio stream

DETAILED DESCRIPTION

In the following description, for the purposes of explanation, specific details are set forth in order to provide a thorough understanding of the invention. However, it will be apparent that the invention may be practiced without these specific details. Various aspects and features of example embodiments of the invention are described in more detail hereinafter.

Figure 1:
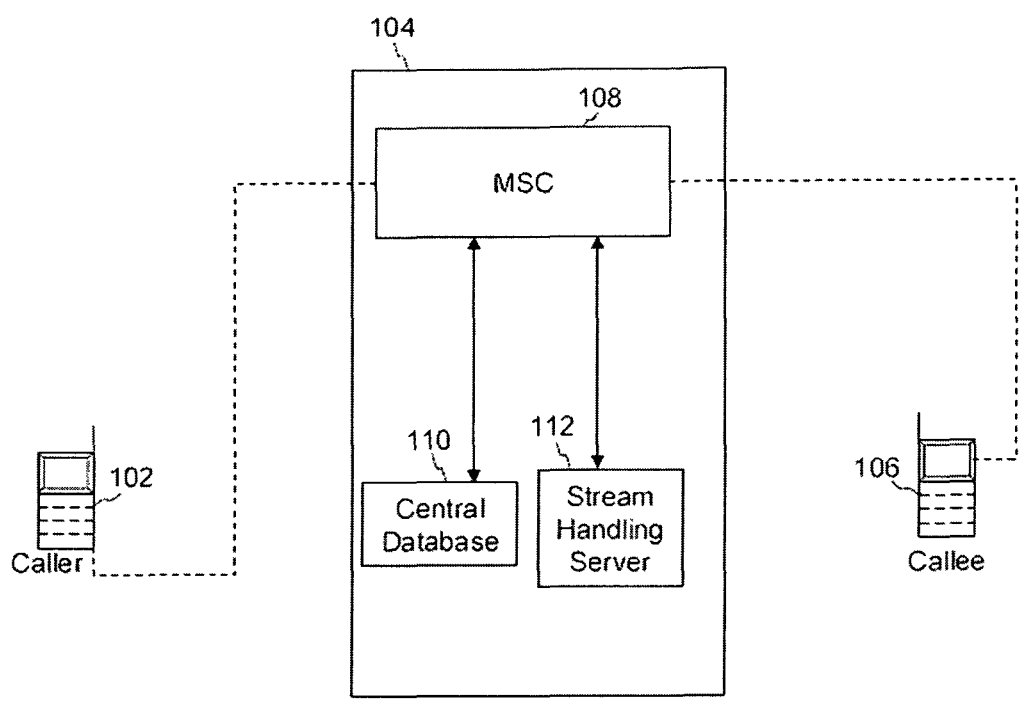
FIG. 1 is a schematic depicting a telecommunication environment.

FIG. 1 is a schematic depicting a telecommunication environment having therein an embodiment of the present invention. Telecommunication service provider enables caller 102 to connect to a telecommunication infrastructure 104 for making a call to callee 106. Caller 102 and callee 106 may use telecommunication terminals like a landline telephone, mobile telephone, etc. to connect to telecommunication infrastructure 104. Telecommunication infrastructure 104 comprises switching centers for e.g. a Mobile Switching Center (MSC) 108 for enabling a call connection between caller 102 and callee 106.

Telecommunication infrastructure 104 also comprises a central database 110 used to store user information related to users of the telecommunication service. An example of central database 110 is a home location register (HLR). For each user, the user information comprises a unique identifier for the user, telephone number of the user, current location of the user, various services, like the RBT service, the user has registered for and the likes.

Telecommunication infrastructure 104 further comprises a stream handling server 112. Stream handling server 112 is used to provide streaming audio to caller 102. The method of providing streaming audio is discussed in conjunction with FIG. 2. Stream handling server 112 has been described in detail in conjunction with FIG. 3.

Figure 2:
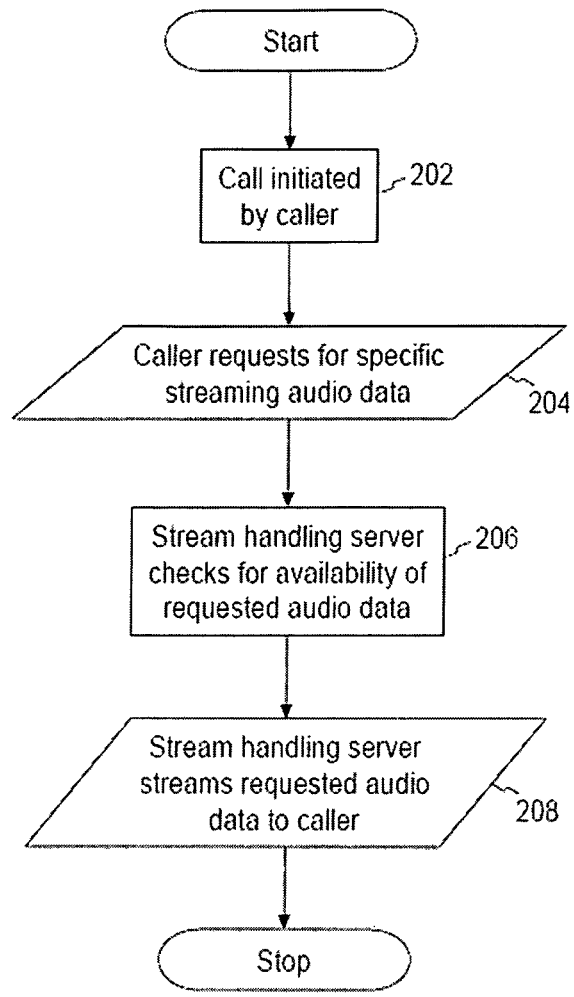
FIG. 2 is a flow diagram illustrating a method of streaming audio to a caller, in accordance with an embodiment of the invention.

FIG. 2 is a flow diagram illustrating the method of streaming audio to caller 102. At step 202, caller 102 initiates a call. According to an embodiment of the invention, caller 102 can initiate a call with stream handling server 112 by calling a pre specified number. The call is forwarded to stream handling server 112 by MSC 108. In another embodiment of the invention, caller 102 initiates call with callee 106. While caller 102 is waiting for callee 106 to respond to the call, the call is forwarded to stream handling server 112 by MSC 108. In one embodiment of the invention, the call is forwarded to stream handling server 112 if callee 106 is an RBT subscriber. Thus, a call connection is established between caller 102 and stream handling server 112.

After a call connection has been established between caller 102 and stream handling server 112, at step 204, caller 102 requests stream handling server 112 for specific audio data to be streamed. For example, caller 102 may request stream handling server 112 for news. The different modes of requesting stream handling server 112 are discussed in detail in conjunction with FIG. 5.

Upon receiving the request from caller 102, at step 206, stream handling server 112, checks for the availability of requested audio data. The various checks performed by stream handling server 112 have been discussed in conjunction with FIG. 6.

At step 208, stream handling server 112 provides the requested audio data to caller 102. The requested audio data is streamed to caller 102. Step 208 is discussed in detail in conjunction with FIG. 5.

Figure 3:
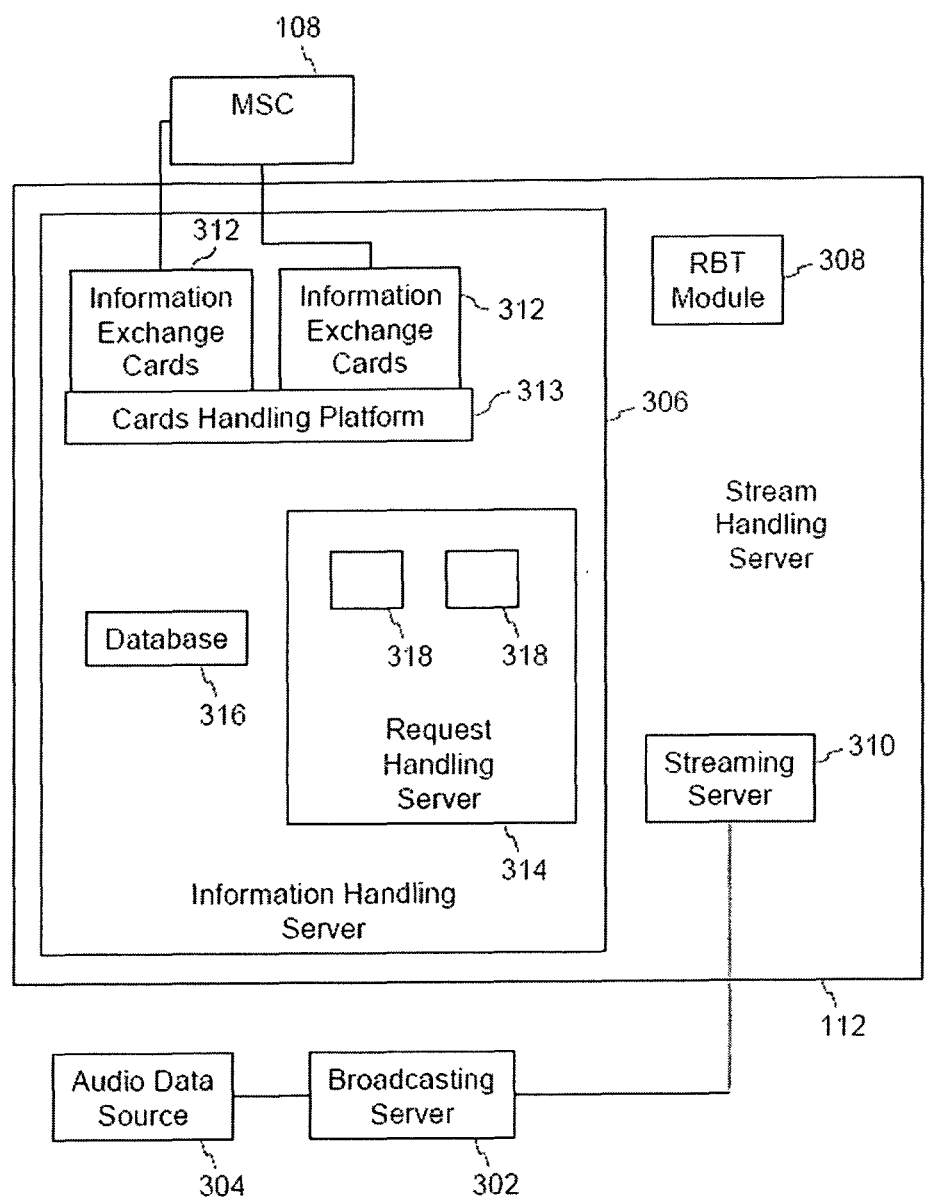
FIG. 3 is a block diagram illustrating a stream handling server, in accordance with an embodiment of the invention.

FIG. 3 is a block diagram illustrating stream handling server 112 in accordance with an embodiment of the invention.

Stream handling server 112 receives streaming audio data from a broadcasting server 302 and streams the audio data to caller 102. The method of streaming audio data to caller 102 is discussed in detail in conjunction with FIG. 5. Broadcasting server 302 is the link between stream handling server 112 and an audio data source 304. According to an embodiment of the invention, broadcasting server 302 is a computer system.

A plurality of broadcasting servers 302 may be used to form a link between audio data source 304 and stream handling server 112. Broadcasting server 302 is connected to audio data source 304 or another broadcasting server 302 at one end of the link, and to stream handling server 112 on the other end. The streaming audio data travels from audio data source 304, through the plurality of broadcasting servers 212 forming the link to reach stream handling server 112.

Audio data source 304 is the source where audio data, to be streamed to caller 102, originates. Audio data source 304 transmits the audio data to broadcasting server 302 using standard protocols like http, TCP/IP, etc. According to an embodiment of the invention, audio data source 304 is a computer system. An individual may use the computer system to provide the audio data. For example, using a microphone or similar devices connected to the computer system, the individual provides live commentary for a sports event. It will be apparent to persons skilled in the art that means, other than the computer system, may be used to provide the audio data. To enable audio data source 304 to transmit the audio data to broadcasting server 302, certain plug-ins like a Winamp™ shoutcast plugin may be installed in audio data source 304. The plugin may be coded using a programming language like C/C++, Java, Python, etc or a combination thereof.

Stream handling server 112 comprises information handling server 306, an RBT module 308 and a streaming server 310. Information handling server 306 comprises a plurality of information exchange cards 312, a cards handling platform 313, a request handling server 314, and a database 316.

Information handling server 306 comprises a plurality of information exchange cards 312 to communicate with MSC 108. Examples of information exchange cards 312 are media cards and signaling cards. Signaling cards are used for processing signals to and from MSC 108 that provide specific information related to a call. For example, MSC 108 sends signals regarding initiation of call by caller 102, termination of call by caller 102, termination of call by callee 106 etc. The signals are transmitted using standard protocols. Examples of protocols for signal handling are the SS7 protocol, PRI protocol etc. An example of signaling cards are NMS TX-4000 cards.

Media cards are used for processing media, for example music playback, DTMF, voice recording etc. to and from MSC 108. Any audio streamed to caller 102 is via media cards. Similarly pressing of any DTMF key by caller 102, or any voice command like 'news' by caller 102 is received through media cards. An example of media cards are NMS AG-4040 cards.

Signaling cards and media cards comprises software components used for signal and media processing and handling respectively. The software component may be written in C/C++, java or any other programming language.

Cards handling platform 313 handles transfer of data to and from information exchange cards 312. Cards handling platform 313 modifies data to standard circuit switched network protocols like SS7 protocol, PRI protocol etc. Information exchange cards 312 receive the modified data in the standard circuit switched network protocols from cards handling platform 313 and transmits the modified data to MSC 108. According to an embodiment of the invention, cards handling platform 313 is implemented in form of software that interfaces information exchange cards 312 with information handling server 306.

Request handling server 314 handles requests from caller 102 coming via information exchange cards 312. Request handling server 314 comprises a plurality of applications 318 written in computer programming language like C/C++, Java or any other programming language. Each application 318 handles specific requests. According to an embodiment of the invention, a particular application 318 streams audio data to caller 102 via information exchange cards 314. Handling of requests from caller 102 and streaming of audio data to caller 102 by particular application 318 of request handling server 314 has been discussed in detail in conjunction with FIG. 5. Request handling server 314 comprises an Interactive Voice Response (IVR) application for collecting audio information from caller 102. Interactive Voice Response (IVR) application may be, for example, a particular application 318. According to an embodiment of the invention, request handling server 314 comprises an IVR server. The IVR server further comprises a speech recognition system, a text to speech conversion engine, and a state machine. The state machine provides a framework for implementing user interaction logic for the IVR server.

Audio information is collected for determining the audio data which caller 102 wants to be streamed. Audio information is discussed in conjunction with FIG. 5. According to an embodiment of the invention, applications 318 collect the audio information from caller 102 by interacting with caller 102. According to another embodiment of the invention, the IVR application collects the audio information from caller 102 by interacting with caller 102 and makes the audio information available to applications 318.

Database 316 is used to store subscription information related to RBT subscribers. The subscription information may include phone number of the subscriber, time of subscription, information regarding RBT of RBT subscriber etc. Further, database 316 stores URL addresses of broadcasting servers 302. Database 316 is accessed by various applications in the request handling server 314.

According to an embodiment of the invention, audio data is streamed to caller 102 as RBT. RBT module 310 comprises an RBT application written in computer programming language like C/C++, Java or any other programming language.

Figure 6:
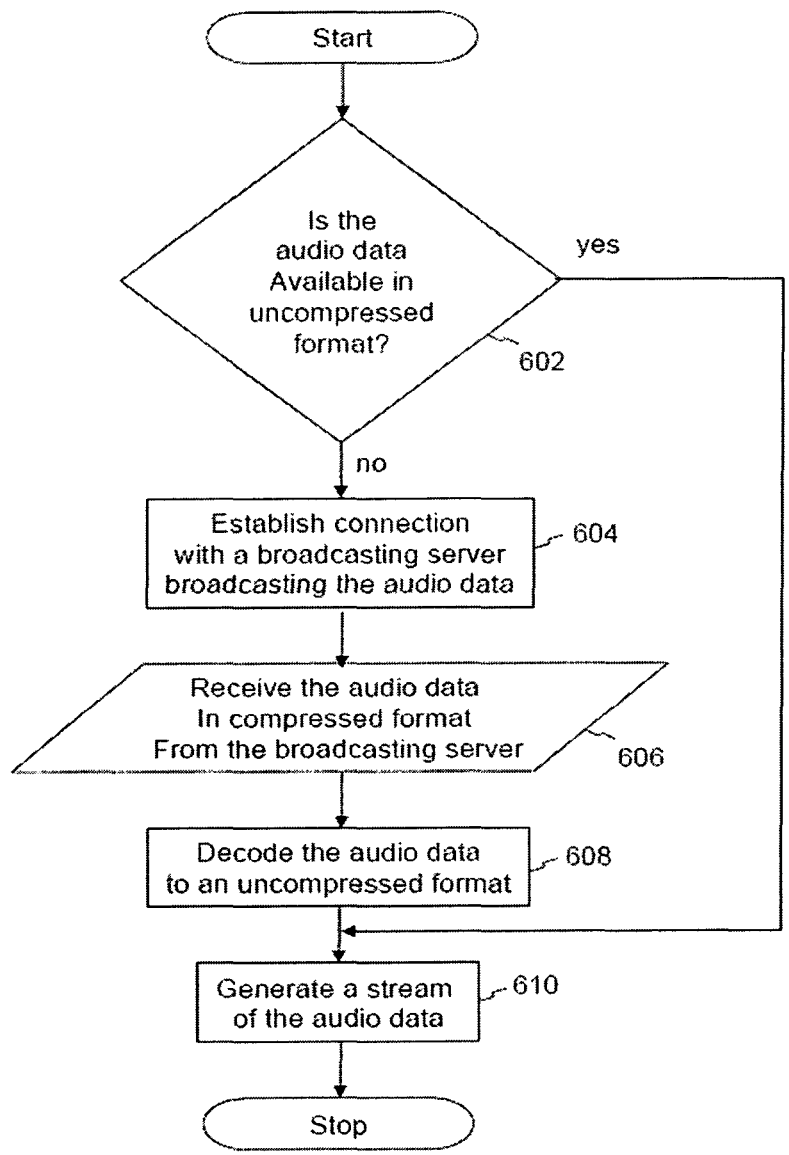
FIG. 6 is a flow diagram depicting a method for checking the availability of streaming audio data, in accordance with an embodiment of the invention.

Streaming of audio data as RBT to caller 102 is discussed in detail in conjunction with FIG. 6.

Figure 4:
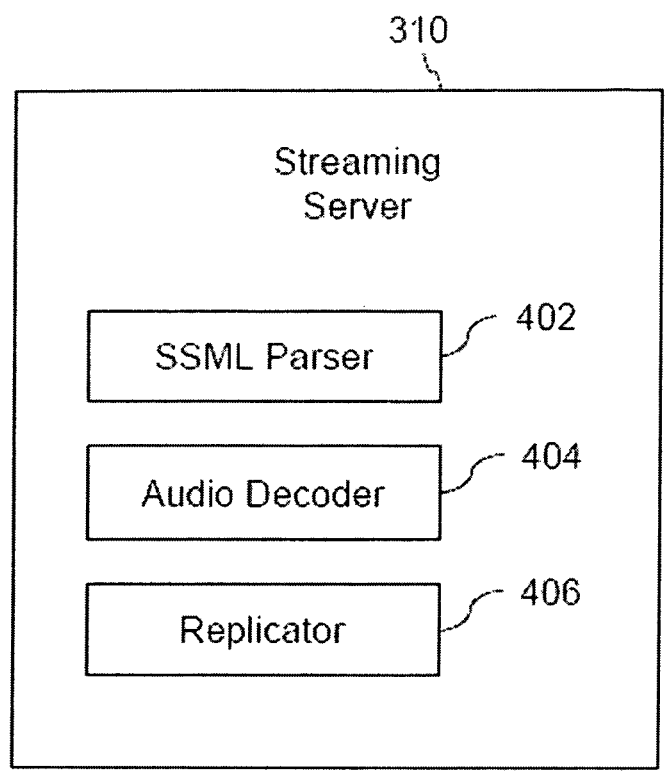
FIG. 4 is a block diagram illustrating a streaming server, in accordance with an embodiment of the invention.

FIG. 4 is a block diagram illustrating streaming server 310. Streaming server 310 is a computer system based server. According to an embodiment of the invention, streaming server 310 is a SSML (speech synthesis markup language) server. Streaming server 310 comprises a SSML parser 402, an audio decoder 404 and a replicator 406.

SSML parser 402 serve as an interface between streaming server 310 and information handling server 306. After caller 102 sends a request for accessing the streaming service, the request is notified to streaming server 312 through SSML parser 402 using standard SSML format. SSML parser is a software application and may be written in a computer programming language like C/C++, Java, or any other programming language.

Streaming server 310 receives audio data from broadcasting server 302. Standard protocols like http, TCP/IP, etc can be used for the audio data transfer from broadcasting server 302 to streaming server 310. According to an embodiment of the invention, streaming server 310 connects to broadcasting server 302 using ports like TCP/IP ports.

According to another embodiment of the invention, streaming server 310 receives the audio data from broadcasting server 302 in a compressed format, for example, MP3, WMA, OGG, and the likes. The compressed audio data is uncompressed using audio decoder 404 into an uncompressed format like WAV format or the likes. Audio decoder 404 is a computer program and may be implemented using a programming language like C/C++, Java, etc. or a combination thereof.

Streaming server 310 is capable of streaming uncompressed audio data to a plurality of users simultaneously. Replicator 406 enables the streaming of the uncompressed audio data to a plurality of users simultaneously. Replicator 406 receives the uncompressed audio data from audio decoder 404. Based on the number of callers requesting for the audio data, replicator 406 generates a plurality of streams from the uncompressed audio data. For each user requesting for the audio data, a stream is generated by replicator 406. According to an embodiment of the invention, replicator 406 generates the plurality of streams by replicating the uncompressed audio data and transmitting the plurality of streams to information handling server 306 through a plurality of ports.

Figure 5:
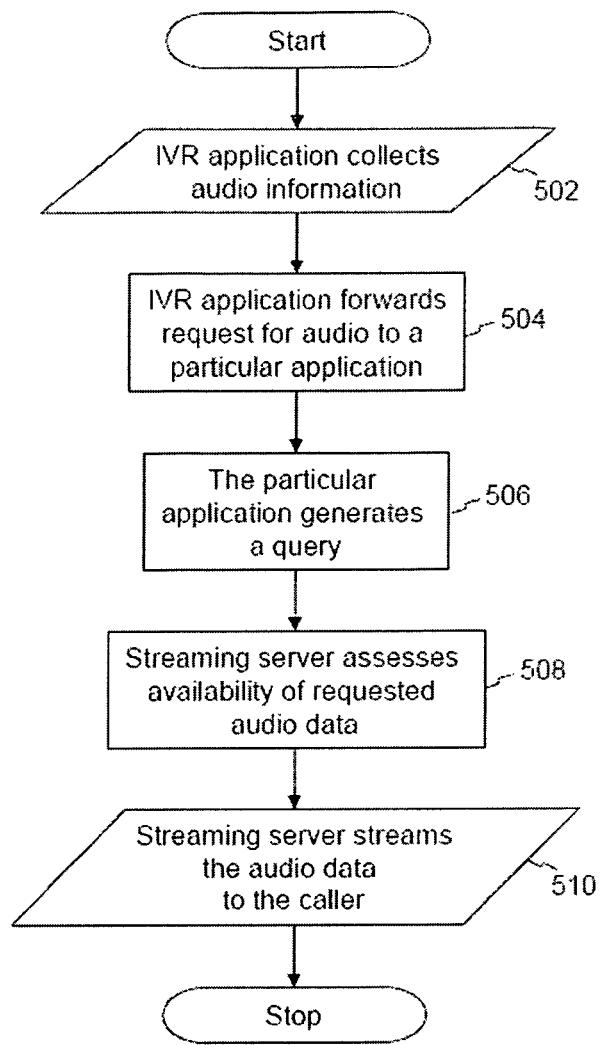
FIG. 5 is a block diagram illustrating a stream handling server, in accordance with an embodiment of the invention.

FIG. 5 is a flow diagram illustrating the method of streaming audio data to a plurality of users. As described above, a call connection is established between caller 102 and stream handling server 112.

At step 502, audio information is collected by IVR application in request handling server 316. The audio information provides information related to the audio data requested by caller 102. The information provided by the audio information includes, without limitation, telephone number of the user, language in which the audio data is to be streamed and certain details of the audio data, for example, name of song or name of sport for which live commentary is required, name of at least one team participating in a match for which live commentary is required, etc. According to an embodiment, caller 102 needs to register to a streaming service in order to be able to receive the audio data through streaming. The information provided by the caller request signals will then include the registration details of caller 102.

According to an embodiment of the invention, an interactive session takes place between caller 102 and IVR application for the IVR application to collect audio information. The IVR application provides certain instructions to caller 102 enabling caller 102 to specify her choice of audio for streaming. Based on the instructions, caller 102 gives certain input, for example, by pressing a set of DTMF keys, by giving a voice response etc. In one embodiment of the invention caller 102 provides voice response to IVR application. Based on the input from caller 102, further instructions may be provided to caller 102 until the audio data to be streamed to caller 102 is confirmed. For example, IVR application may provide an instruction, "please speak 'English' for audio in English, 'others' to continue in some other language." to caller 102 to choose a language in which caller 102 wants the audio to be streamed. Caller 102 gives voice response, for example 'English', based on the instruction.

On receiving the response, 'English' from the user, further instructions may be provided to caller 102 like, "please speak 'football' to listen to live football commentary, 'cricket' to listen to live cricket commentary, 'others' to listen to other sports commentary." until the audio data required by the user is confirmed.

At step 504, IVR application forwards request for audio streaming to the particular application 318, based on the audio information, in the request handling module 316. For example, if caller 102 has requested for cricket commentary in English, IVR application forwards request for playing cricket commentary in English to the particular application 318. In case, caller 102 has requested for cricket commentary in Hindi, IVR application forwards the request to a different application 318.

According to an embodiment of the invention, particular application 318 interacts with caller 102 to collect audio information.

At step 506, the particular application, after receiving the request from IVR application, generates a query. The query aims at finding the URL of the broadcasting server 302, related to the requested audio data, from database 316. The application, upon finding the URL of the broadcasting server 302, forwards the URL to streaming server 310. The URL is forwarded to streaming server 310 in SSML format.

At step 508, streaming server assesses the availability of the audio data. Step 508 has been detailed in conjunction with FIG. 6. At step 510, based on the availability of the audio data, the audio data is streamed to caller 102. Replicator 406 transmits a stream of the audio data through a port to card handling platform 313. For a plurality of callers 102, requesting streaming of the audio data, replicator 406 manages a plurality of connections through multiple client ports and/or client IP addresses. Each of these connections is associated with one caller 102. The association of the connection to caller 102 is achieved through cards handling platform 313 and information exchange cards 312. The audio data is then transmitted to the plurality of callers 102 through the plurality of ports. The audio data is streamed through the port using standard packet switched network protocols like http, TCP/IP etc. Cards handling platform 313 receive the audio data in standard packet switched network protocols and convert the audio data in standard circuit switched network protocols like SS7, PRI etc. Information exchange cards 312 receive the audio data from Cards handling platform 313 and stream the audio data to caller 102.

Streaming of audio data continues till caller disconnects the call connection. Information exchange cards 312 receive any such information regarding disconnecting of call connection from MSC 108 and inform the particular application. In such circumstances, the particular application stops playing of audio data.

According to an embodiment of the invention, callee 106 is an RBT subscriber with streaming of the audio data as the RBT of callee 106. For example, callee 106 may select live commentary of cricket matches as the RBT of callee 106. Thus, any caller 102 initiating a call with callee 106 will hear the live commentary of a cricket match, while waiting for callee 106 to respond to the call.

The call initiated by caller 102 with callee 106 is routed through MSC 108. Thereafter, MSC 108 queries central database 110 to identify if callee 106 is an RBT subscriber. Central database 110 responds back to MSC 108 regarding the callee's RBT information. The RBT information includes information like status of RBT subscription for callee 106, and the nature of RBT service accessed by callee 106. MSC 108 then forwards the call to callee 106. After the connection is established between caller 102 and callee 106, i.e., the phone of callee 106 starts ringing, a switch at MSC 108 forwards the call to stream handling server 112. In one embodiment of the invention, call is transferred to stream handling server 112 only if callee 106 is an RBT subscriber with streaming audio as RBT. Information handling cards 312 receive signal regarding the establishment of connection and forwards the call to RBT module 308. Thus a call connection is established between caller 102 and stream handling server 112. RBT module 308 obtains information regarding RBT of callee 106 from database 316. For example, callee 106 may have chosen live streaming of audio data like English cricket commentary as RBT. The information regarding RBT includes, without limiting to, subscription details of callee, URL of broadcasting server 302 broadcasting the audio data etc. RBT module 308 after getting information regarding RBT of callee 106, forwards the URL to streaming server 310 in a SSML format.

As described in conjunction with FIG. 5, streaming server 310 streams the audio data to RBT module 308 which further streams the audio data to caller 102 through information exchange cards. The streaming of audio data to caller 102 is stopped once callee 106 initiates a response or if a pre-specified time lapses.

FIG. 6 is a flow diagram depicting step 508 wherein the availability of the audio data is assessed.

Streaming server 310 receives the audio data from broadcasting server 302. According to an embodiment of the invention, once the audio data is available in streaming server 310, the audio data can be made available to a plurality of users without making any additional connections to broadcasting server 302. The audio data is received from broadcasting server 302 in a compressed format, like mp3, ogg, rm, etc. The audio data is uncompressed by audio decoder 306 into an uncompressed format like way format.

At step 602, a determination is made if the audio data is available at streaming server 310 or not. The availability of the audio data at streaming server 310 implies that no new connections are required with broadcasting server 312 and the audio data can be streamed to a plurality of users.

If the audio data is not available at streaming server 310, then at step 604, streaming server 310 establishes connection with broadcasting server 302, based on the URL received from particular application 308. The connection is established using standard data transfer protocols like http, TCP/IP, etc or a combination thereof.

At step 606, broadcasting server 302 transmits the audio data to streaming server 310 using standard protocols like, http, TCP/IP, etc or a combination thereof. Broadcasting server 302 receives the audio data from audio data source 304. Standard protocols are used for the transfer of the audio data from audio data source 304 to broadcasting server 302 like, http, TCP/IP, etc. or a combination thereof. According to an embodiment of the invention, a plurality of broadcasting servers 302 are used to transfer the audio data from audio data source 304 to streaming server 310.

According to an embodiment of the invention, the audio data is received from broadcasting server 302 in a compressed format like MP3, OGG, WMA, etc. At step 608, audio decoder 306 decodes the compressed audio data into an uncompressed format like way or the likes. The audio data, once uncompressed, is ready to be streamed to a plurality of users.

Based on the plurality of callers 102 requesting the audio data, at step 610, a plurality of streams of the audio data are created by replicator 406. A stream of the audio data is created for each caller 102 requesting the audio data.

The invention claimed is:

1. A method for streaming audio data to multiple callers, the multiple callers being connected to a telecommunication infrastructure, each of the multiple callers having initiated a call session with a respective callee in the telecommunication infrastructure, the method comprising the steps of:
   a) receiving a callee ring back tone (RBT) information;
   b) identifying a broadcasting server from a plurality of broadcasting servers connected to an audio data source based on the callee ring back tone information;
   c) checking for an established connection with the identified broadcasting server connected to the audio data source, wherein the connection is established over a packet switched network;
   d) receiving the audio data through the established connection with the broadcasting server connected to the audio data source over the packet switched network;
   e) replicating the received audio data to generate a plurality of data streams, each data stream comprising the received audio data:
   f) simultaneously streaming, as an RBT during RBT playback time of the call session, each of the plurality of generated data streams to each of the multiple callers over a circuit switched network.

2. The method as recited in claim 1 further comprising the step of establishing a connection with the identified broadcasting server connected to the audio data source.

* * * * *